United States Patent
Dubinsky

(10) Patent No.: US 7,596,686 B2
(45) Date of Patent: Sep. 29, 2009

(54) POWER MANAGEMENT SYSTEM

(75) Inventor: Dean V. Dubinsky, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/781,087

(22) Filed: Jul. 20, 2007

(65) Prior Publication Data

US 2007/0266266 A1    Nov. 15, 2007

Related U.S. Application Data

(63) Continuation of application No. 10/334,293, filed on Dec. 30, 2002, now Pat. No. 7,290,152.

(51) Int. Cl.
*G06F 9/00* (2006.01)

(52) U.S. Cl. .............................. 713/2; 713/1; 713/100; 713/324

(58) Field of Classification Search ......... 713/300–375, 713/1, 2, 100
See application file for complete search history.

(56) References Cited

U.S. PATENT DOCUMENTS

| | | |
|---|---|---|
| 5,566,297 A | 10/1996 | Devarakonda et al. |
| 5,787,297 A | 7/1998 | Lin |
| 5,802,305 A | 9/1998 | McKaughan et al. |
| 5,867,704 A | 2/1999 | Tanaka et al. |
| 5,913,068 A | 6/1999 | Matoba |
| 5,996,083 A | 11/1999 | Gupta et al. |
| 6,000,036 A | 12/1999 | Durham et al. |
| 6,058,445 A | 5/2000 | Chari et al. |
| 6,098,158 A | 8/2000 | Lay et al. |
| 6,101,601 A | 8/2000 | Matthews et al. |
| 6,105,089 A | 8/2000 | Chari et al. |
| 6,134,615 A | 10/2000 | Chari et al. |
| 6,226,667 B1 | 5/2001 | Matthews et al. |
| 6,266,776 B1 | 7/2001 | Sakai |
| 6,604,201 B1 | 8/2003 | Takahashi et al. |
| 6,711,691 B1 | 3/2004 | Howard et al. |

(Continued)

FOREIGN PATENT DOCUMENTS

EP    658843 A1    6/1995

(Continued)

OTHER PUBLICATIONS

"Advanced Configuration and Power Interface Specification", Jul. 27, 2000, Revision 2.0.

*Primary Examiner*—Mark Connolly
*Assistant Examiner*—Paul B Yanchus, III
(74) *Attorney, Agent, or Firm*—Lieberman & Brandsdorfer, LLC

(57) ABSTRACT

A power management system for a multiple compute component system. The management system enables operational management of individual compute components in two low power states of operation, suspend and hibernate. In addition, the management system enables granular management of power consuming accessories within an individual compute component. When a compute component is in the low power state of suspend or hibernate, it may be hot-swapped to a different locale. In addition, when a compute component is restored from a low power state of hibernate, it may access an alternate image in the system. Accordingly, the power management system allows for five state of operation of an individual component in a multiple compute component system.

18 Claims, 5 Drawing Sheets

U.S. PATENT DOCUMENTS

| | | |
|---|---|---|
| 6,745,335 B1 | 6/2004 | Kusano |
| 6,836,849 B2 | 12/2004 | Brock et al. |
| 6,901,522 B2 | 5/2005 | Buch |
| 7,290,152 B2 * | 10/2007 | Dubinsky .................. 713/300 |
| 2002/0007463 A1 | 1/2002 | Fung |

FOREIGN PATENT DOCUMENTS

| | | |
|---|---|---|
| EP | 1037133 A1 | 9/2000 |

* cited by examiner

POWER MANAGEMENT SYSTEM

CROSS REFERENCE TO RELATED APPLICATION(S)

This application is a continuation of application Ser. No. 10/334,293, filed Dec. 30, 2002, now pending, which is hereby incorporated herein by reference.

BACKGROUND OF THE INVENTION

1. Technical Field

This invention relates to an apparatus and method for managing power consumption in a computing environment. More specifically, the invention relates to management of individual compute components in a multiple compute component environment.

2. Description of the Prior Art

Laptop computers are personal computers that generally include a microprocessor, hardware storage, an I/O port, and a communication port. The laptop may function independently for personal computing needs, or if it includes a network adaptor or modem, the laptop may become part of a local area or wide area network.

One of the features present on today's laptop and personal computers is the ability of the computer to be placed in a low power state of operation, such as Suspend and Hibernate. Both of these low power states of operation are known in the art in relation to personal computers. In the Suspend state, power to the processor or other accessories on the motherboard is turned off, but the memory remains intact. This is a state of low power consumption. When the operator of the computer wants to regain usage of the hardware accessory, the operator must Restore full power to the processor, the motherboard, and the associated hardware accessories, although a full system restart is not necessary since the memory remains intact. In addition to the Suspend state, the personal computer may also be placed in the low power state of Hibernate where power to the computer is turned off following placement of the memory to disc. Therefore, in general it is less time consuming to enter the Suspend state and Restore power to the computer or to enter the Hibernate state and Resume power to the computer, rather than to terminate power to the computer and restart the full system at a later time. Accordingly, use of the Suspend state on the laptop or personal computer is one example of power management on a personal computer system.

A multiprocessor computer system by definition contain multiple processors, also referred to herein as CPUs, that can execute multiple processes or multiple threads within a single process simultaneously in a manner known as parallel computing. In general, multiprocessor systems execute multiple processes or threads faster than conventional uniprocessor systems, such as personal computers (PCs), that execute programs sequentially. The actual performance advantage is a function of a number of factors, including the degree to which parts of a multithreaded process and/or multiple distinct processes can be executed in parallel and the architecture of the particular multiprocessor system at hand.

The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. In centralized shared memory machines, on the other hand, the memory is physically in one location. Centralized shared memory computers are called uniform memory access (UMA) machines because the memory is equidistant in time for each of the processors. Both forms of memory organization typically use high-speed caches in conjunction with main memory to reduce execution time.

Processor nodes may be grouped to form a partition, which is a collection of one or more nodes interconnected together to form a computing environment for an operating system. Multiple partitions can exist within the same computer system. Each partition within a computer system executes a single independent operating system image. A multiprocessor computer system may be in the structure of a collection of nodes or partitions, including service processor hardware, a management console and other infrastructure, representing a single manageable and configurable environment. Accordingly, a system can be split into multiple logical computer systems or partitions, each of which executes a single operating system image.

In addition to multiprocessor computing systems in the form of partitioned nodes, there are also bladed multiprocessing computing systems. The bladed system is a collection of distributed computing resources available over a local or wide area network that appears as one large virtual computing system to an end user or application. Each computing resource is a server on a removable card that plugs into a shared infrastructure which plugs into a rack. The computing resources may share a keyboard, a monitor, and a connection to the local or wide area network. Each resource within the system may be configured to function under different operating systems. Accordingly, a bladed multiprocessing system is an example of a scalable system with multiple resources adapted to communicate through common communication connections.

A partitioned multiprocessor computing environment and a bladed multiprocessor computing environment are both comprised of multiple compute components. Each component includes at minimum a printed circuit board with one or more microprocessors and a communication port. Current management of multiple compute component systems, including bladed computer systems as well as partitioned computer systems, require shut-down of a specific compute component when maintenance is required. Each component operates in one of two states, on or off. There is no intermediate state of operation. This affects power management of a component or power consuming accessory on a component, as well as scheduled and unscheduled maintenance of a component. Accordingly, there is a need to enable intermediate states of operation of a component in a computer system to enable effective power management of components within a networked computing environment.

SUMMARY OF THE INVENTION

This invention comprises a power management system within a multiple compute component computing environment. The system manages power on both a macro-scale and a micro-scale level of operation.

In one aspect of the invention, a method is provided for managing power within a compute component of a multiprocessor system. Utilization of at least two compute components in a networked computer environment are individual analyzed. It is then determined if a continued operating state is required for each of said compute components based upon the analysis. In response to the determination of the operating state, a state of operation of the computer components are individually modified. One available state supports communication of an operating system image of the compute component to storage media.

In another aspect of the invention, a multiprocessor computing system is provided with at least two compute components in a networked computing environment. A manager is provided in the system to analyze operation of the components within the networked computing environment. The operation analyzed includes component utilization. The manager individually modifies a state of operation of the components in response to the analysis. One available state supports communication of an operating system image of the compute component to storage media.

In yet another aspect of the invention, an article is provided with a computer-readable carrier including computer program instructions configured to manage power of a compute component. Instructions are provided to individually analyze operation of at least two compute components within a networked computer environment. Additionally, instructions are provided to determine if a continued operating state is required for each of the compute components based upon said analysis, and to modify a state of operation of the components in response to the determination of the required operating state. One available state supports communication of an operating system image of the compute component to storage media.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Power management of individual compute components in a multiple compute component system enhances operating efficiency of both the individual component and the system. Management of individual components may be on the level of placing an entire component into a low power state of operation. Alternatively, management of individual component may be in the form of granular management of a power consuming accessory in the compute component. Both forms of power management enhance efficiency and operation of the component and the system as a whole.

Technical Details

Figure 1:
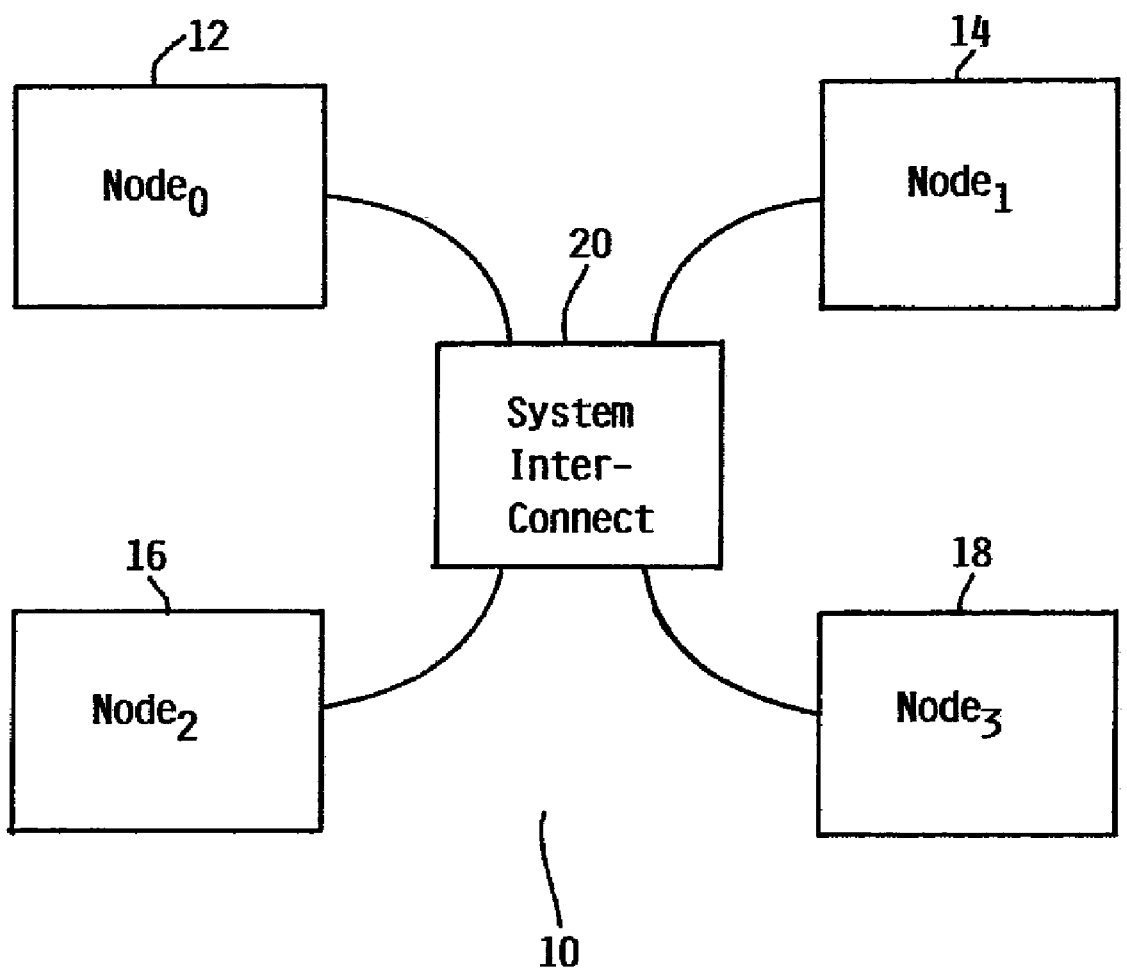
FIG. 1 is a block diagram of a prior art partitionable multiprocessor computer system.

As illustrated in FIG. 1, a multiprocessor system (10) may include multiple nodes. The system (10) uses a Distributed shared Memory (DSM) architecture, which may or may not be a Non-Uniform Memory Access machine (NUMA). As shown in FIG. 1, there are four nodes (12), (14), (16) and (18) that are each connected by a system interconnect (20) that permits any node to communicate with any other node in the system. The purpose of the system interconnect (20) is to allow processors in any node to access the memory resident in any other node in the system. The physical links of system interconnect (20) provide high bandwidth and low latency and are scalable to allow for the addition of more nodes in the system (10). Accordingly, the multiprocessor system (10) is an example of a partitionable computer system.

Figure 2:
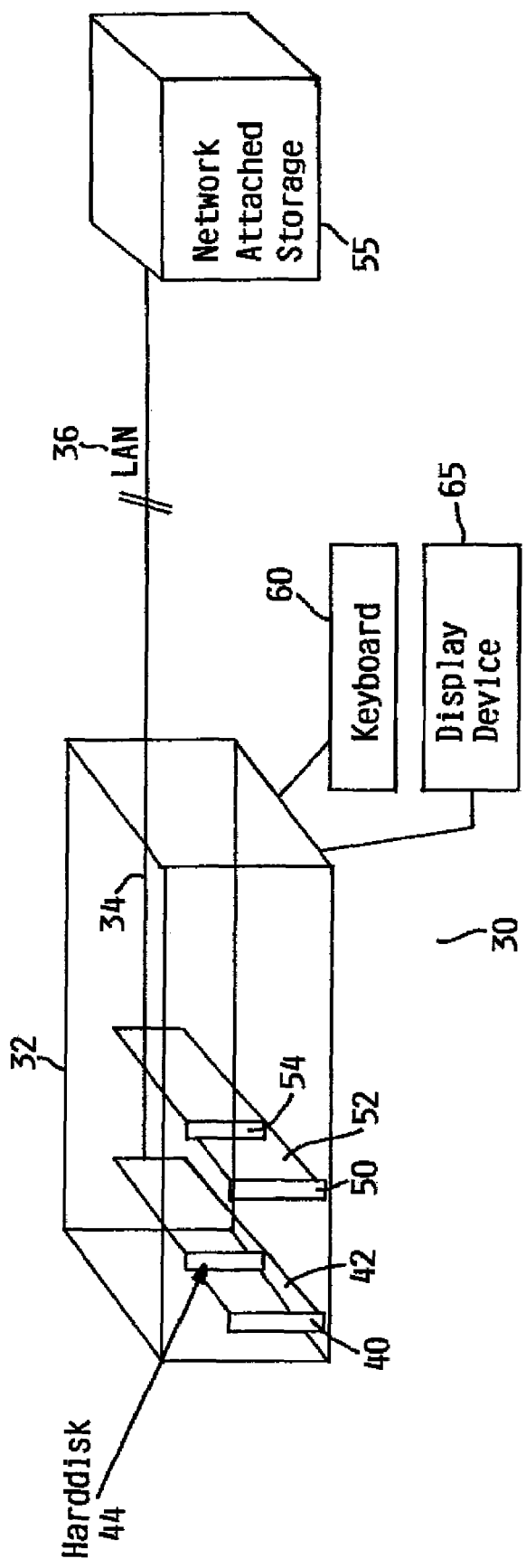
FIG. 2 is a diagram of a prior art bladed multiprocessor computer system.

The compute component in the system may be in the form of a partition within a partitionable system, a blade, or an equivalent partitionable compute component. The component is a printed circuit board that contains one or more microprocessors and a communication port, and it may optionally contain hardware accessories, such as storage hardware, memory, an I/O port, and a battery. FIG. 2 is an example of a multiple component system (30), with the components (40) and (50) stored in a chassis (32). $Component_1$ (40) is a printed circuit board (42) shown with a hard disk (44) and without a battery. $Component_2$ (50) is printed circuit board (52) shown with a battery (54), but without a hard disk. Both $Component_1$ (40) and $Component_2$ (50) have individual communication ports (not shown). The components, (40) and (50) share a communication line (34) to a local area network (36). As shown, the local area network (36) is in communication with both $Component_1$ (40) and $Component_2$ (50). The chassis (32) is an enclosure adapted to store one component or a plurality of components. All of the components within the chassis (32) share a keyboard (60), a display device (65), and the communication line (34) to the local area network (36). The chassis (32) is also used to provide external power to each of the components. Both components (40) and (50) are shown connected to a network attached storage (55) through the local area network (36). Since $Component_1$ (40) has it's own hard disk it may store data locally on it's own storage hardware, or it may write it's storage information directly to the network attached storage (55). Alternatively, $Component_1$ (40) may use it's access to the local area network (36) to store data in a central location.

In the prior art, each compute component in a multiple component computer system has the ability to run in one of two states of operation, maximum power or no power. In the preferred embodiment, each component may operate in one of five states, two of the states being maximum power or no power. The three remaining states are intermediate states of operation. The first of the three intermediate states of operation is a selective reduction of power. This state enables the component to continue operation, but may not provide optimum performance of the full capabilities of the component and any associated power consuming accessories. The second of the three intermediate states of operation is known as Suspend. This state enables the component to continue operating in a low power state. In order to select the Suspend state, the component must have a battery or remain in communication with a power source. To return the component to full power from the Suspend state, the operator must Resume power to the component. The Resume procedure returns the component to full operating power without requiring a reboot of the component. The third intermediate state of operation is known as Hibernate. In the Hibernate state, all memory contents of the compute component are written to network attached storage, and a marker is sent to the operating system not to boot when the component is restored. The marker will indicate to the operating system to retrieve the memory contents stored in the network attached storage. This enables the component to return to a medium or full power state of operation faster than that provided from a reboot of the component. The Hibernate state requires the component to write it's memory to storage prior to termination of power. When the operator wants to return the component to full power from the Hibernate state, they must Restore the component. The process of restoring the component involves retrieving memory that was stored to the local disc or network attached storage. The three intermediate states of operation enable the operator to return full power at a later time without requiring a complete shut-down of power followed by a rebooting of the component. In each of the intermediate states of operation, less power is consumed by the component and the selected power consuming accessories of the component. Accordingly, the three intermediate states of operation enable an operator of the system to flexibly manage distribution of power to the partitionable components in the computing environment.

Figure 3:
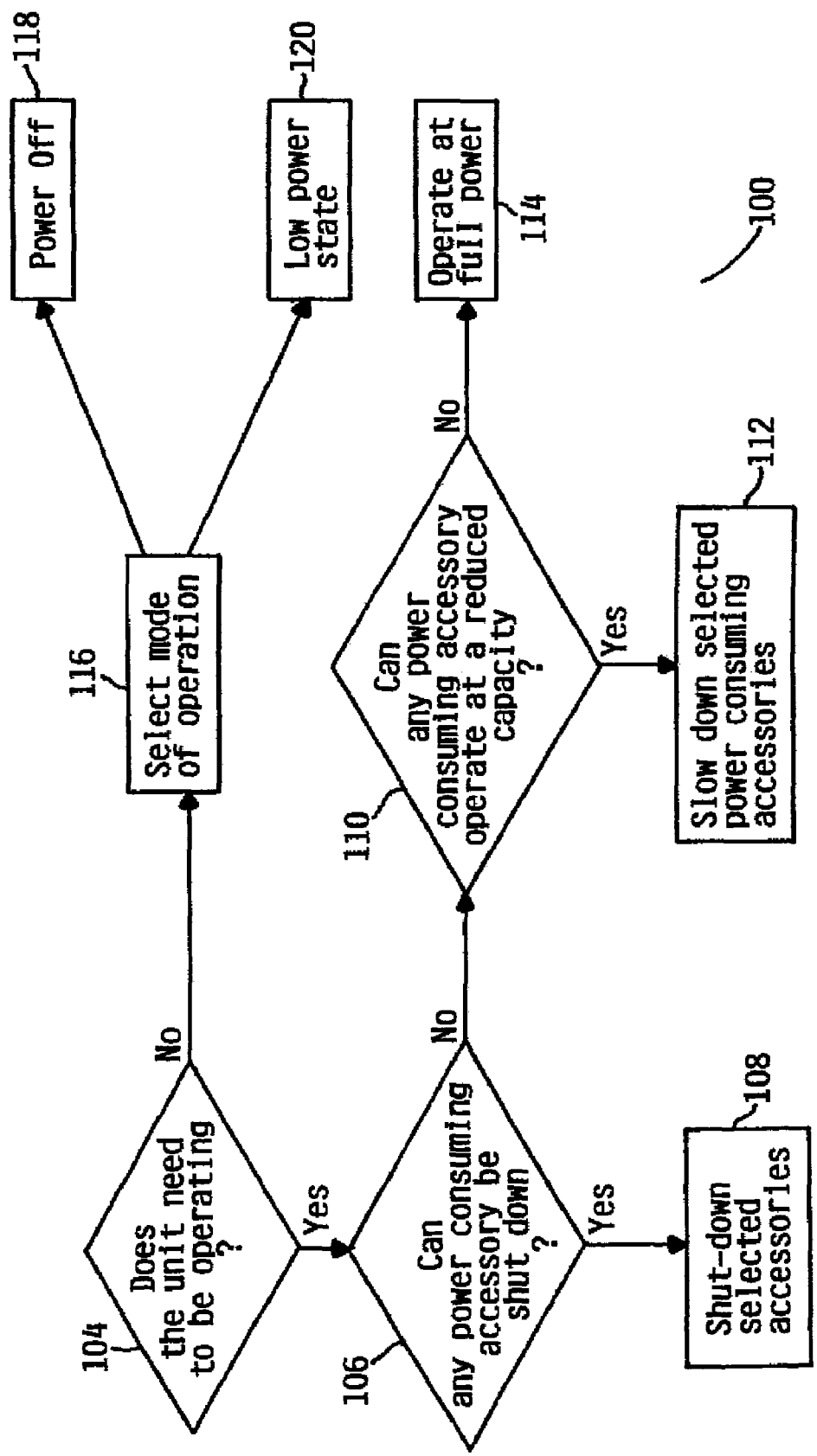
FIG. 3 is a flow chart illustrating granular power management of a compute component according to the preferred embodiment of this invention, and is suggested for printing on the first page of the issued patent.

There are several embodiments which may enable the compute component within the computing system to enter one of the three intermediate states of operation. In one embodiment, system management software may be invoked to control the states of operation of the component, as well as power consuming accessories within a component. FIG. 3 is a flow chart (100) illustrating the process of managing power of a compute component on a granular level, i.e. the component as well as power consuming components of the component. The first step in managing power is to determine if the component requires continued operation (104). This includes analyzing power consumption of the component and determining utilization of the component within the system. If operation of the component is not required, then a selection of a desired low power or no power state of operation is required (116). The state may include shutting off power to the component (118) or placing the component in a low power state (120). If operation of the component is required, the next step is to determine if any of the power consuming accessories are required for operation (106), i.e. if they are being utilized. Power consuming accessories that are not required for operation can be selectively shut-down (108). However, if any of the component accessories are required to be in an operating state, it must then be determined if any of the accessories can operate at a reduced capacity (110). These selected power consuming accessories would then be slowed down on an individual basis (112). For example, a processor that has the capacity to operate at two gigahertz speed may be slowed down to five hundred megahertz to conserve energy. If it is determined that the power consuming accessories cannot operate at a reduced capacity, then they must all remain operating at full power (114). Accordingly, the system management software enables power management of individual components in a multi-compute component system, as well as granular power management of power consuming accessories within individual components.

Figure 4:
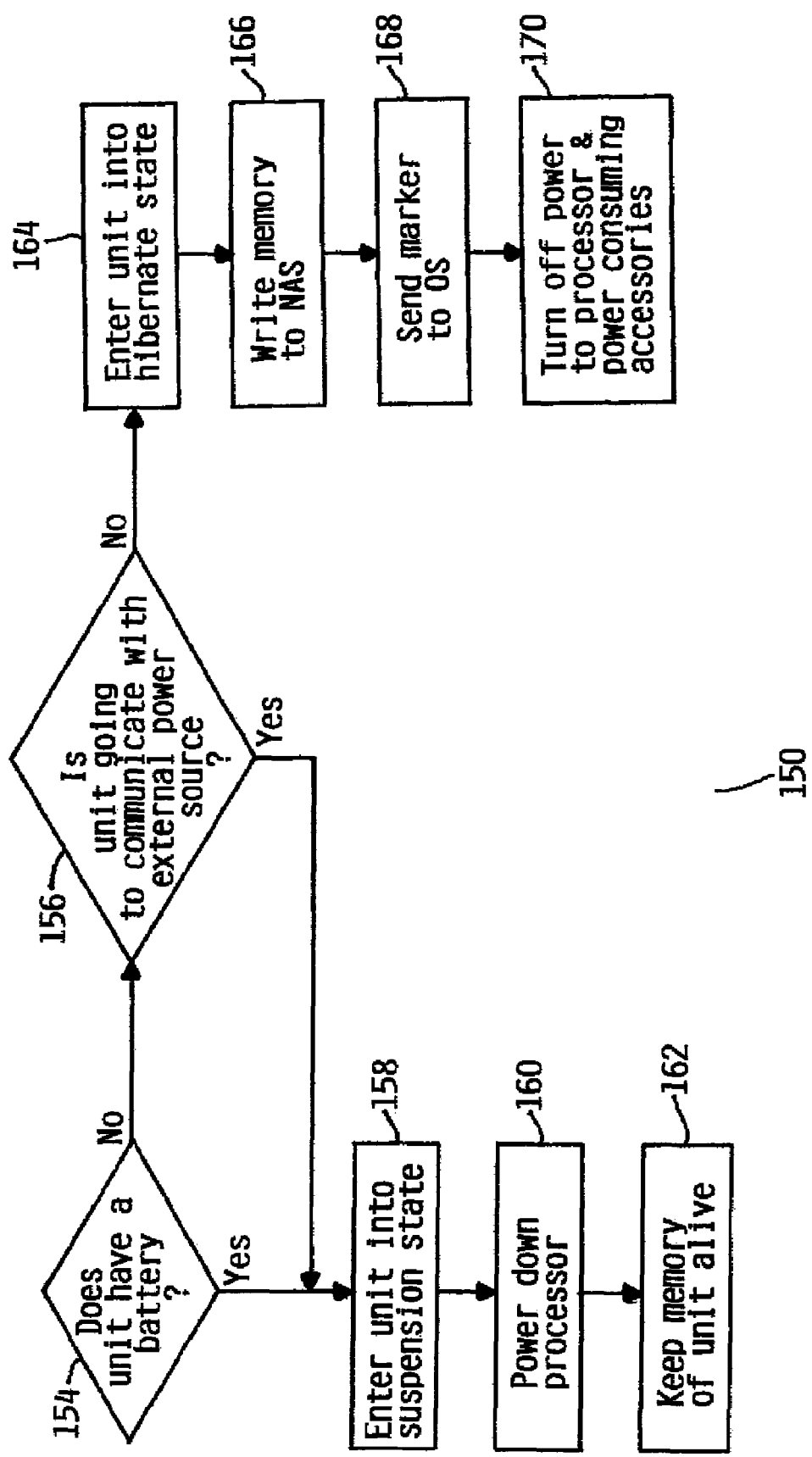
FIG. 4 is a flow chart illustrating selection of a low power state of operation of a compute component.

The power management software enables operational control of individual components in a multi-component system. As noted above, each component in the system may operate in a low power state, i.e. step (120). The low power states are known as Hibernate and Suspend. FIG. 4 is a flow chart (150) illustrating the process of selecting a low power state of operation of a component. Part of the selection of the state of operation includes determining if the component has a battery (154). If the component does not have a battery, it must then be determined if the component will continue to communicate with an external power source (156). In order for the component to remain in a Suspend state for an extended period of time, it requires power for the duration of the suspension. For example, if the component is intended to remain within the chassis, it can continue to receive power from the chassis during the duration it is in a Suspend state. If the query at step (156) is positive, the component may enter the suspended state of operation (158). The processor of the component is then powered down (160), and the memory of the component remains alive (162). In the Suspend state, the component continues to consume power, and therefore requires sufficient power from it's internal battery or continued power from an external power source. In order to bring the component back to a state of operation, the component must proceed through a Resume procedure. This process enables the component to return to full power expeditiously without the need for rebooting the component. Accordingly, if the component is not intended to remain in a low power state of operation for an extended period of time and is required to return to a full power state of operation in an expeditious manner, then the low power state of Suspend may be desirable.

FIG. 4 also illustrates the process of placing a component in the low power state of Hibernate. In this state, the component is not required to have a battery or communication with an external power source. When the component enters the state of Hibernate (164), the component writes it's memory to the local disc or network attached storage (166). The component then sends a marker to the operating system to indicate the placement of the component memory in the local disc or network attached storage (168). This enables the component to access it's image when the component completes the Restore procedure from the Hibernate state. Power to the processor and all power consuming accessories of the component are then turned off (170). Once the component is in a Hibernate state, it may be removed from the chassis without concern of continued power supply to the component. The component may remain in a Hibernate state for an indefinite period of time. The Hibernate component must proceed through a Restore procedure when power is returned to the component with the intention of returning the component to a full or partial power state. The Restore procedure is more time consuming than the Resume procedure associated with the Suspend state, but less time consuming that a reboot of the component. Accordingly, the low power state of Hibernate may be desirable for a long-term low power state of operation.

A compute component within a multiple component system may optionally utilize a disc for local storage if the component is in communication with a network attached storage. In a further embodiment to the Hibernate state, a component that does not include a local hard disk may also take advantage of this low power state. When a component without a hard disk initially enters the Hibernate state, it stores it's image in the network attached storage through a network address in non-volatile memory. A compute component without a local hard disk will require a chip or software on the component that emulates a local disc to the operating system. This chip or software enables communication between the component and the network attached storage. Accordingly, the chip or software enables the component to take advantage of the Hibernate state without requiring the placement of a hard disk on the component.

When a component is in either a Suspend state or a Hibernate state, the component can be removed from the chassis. This enables a component in one of these two low power states of operation to be moved from one slot in the chassis to another slot in the same chassis or a different chassis, i.e. hot-swapped. Once the component is placed in the desired location within the chassis, the component may be brought back to full power through either the Resume procedure from the Suspend state or the Restore procedure from the Hibernate state. Since both of these processes are faster than a complete reboot of the component, they are more desirable when the component is selected for a hot-swapping procedure. Accordingly, in the case of a hot-swap of a component it may be desirable to place the component into the low power state of Suspend or Hibernate depending upon the length of time the component will remain in low power and the time required to return the component to full power.

In addition to enabling hot-swapping of compute components in a low power state, compute components in a Hibernate state may access a different image from the network attached storage during the Restore function without requiring a reboot of the component. When a component enters the Hibernate state, all memory contents are written from a local disc or a SCSI extension to the network attached storage and a marker is sent to the operating system not to reboot the component when power is returned to the component. In addition, the marker functions as an indicator to the component as to the location of the memory in the network attached storage. When power is Restored to the component, the component may optionally access an alternate image on the network attached storage. It is known in a multi-component environment for different components to perform different tasks. For example, a Linux based image and a Windows based image perform different tasks. Both the Linux image and the Windows image can be stored in hibernated states on the network attached storage. As a shift in workload is determined, alternative images may be restored to the component returning from the Hibernate state. Alternative images can be restored on an as needed basis, including re-partitioning a partitioned computing system. The process of restoring alternate images is considerably faster and more efficient than rebooting and/or re-configuring compute components. Accordingly, utilization of hibernated images mitigates transition time between restoring system images.

Advantages Over the Prior Art

The low power states or operation of individual compute components, as well as granular management of power consuming accessories within a component increase operating efficiency of a multi-component computing system. Power may be managed on both a micro and a macro scale. Individual components within a system may operate in one of five levels, ranging from no power to full power, with three intermediate levels of operation. In addition, one of the intermediate levels of operation enables granular management of an individual component. The granular management of the component includes controlling operation of the individual power consuming accessories of the component. The granular management in combination with the software management system provides the ability to reduce power consumption and heat dissipation during period of low utilization, the ability to improve system configuration for alternative workloads, and the ability to schedule maintenance of individual components in a multi-component system.

In addition to granular management of accessories within a component, the power management also enables hot-swapping of components in either a Suspend or Hibernate state. Prior to returning the component to full power through either the Resume or Restore procedures, the component may be placed in a different slot within the chassis, or in a different chassis. Finally, a hibernated component may be restored to full power functioning under a different image than when it was placed in the hibernated state. When a hibernated component is restored, a software management system may be implemented to point the component to an alternative image within the network attached storage. This provides increased flexibility to the components based upon the workload of the system, without requiring a full reboot of the component to a different image. Accordingly, the power management disclosed herein provides increased operating efficiency to a multi-component computing system.

Alternative Embodiments

Figure 5:
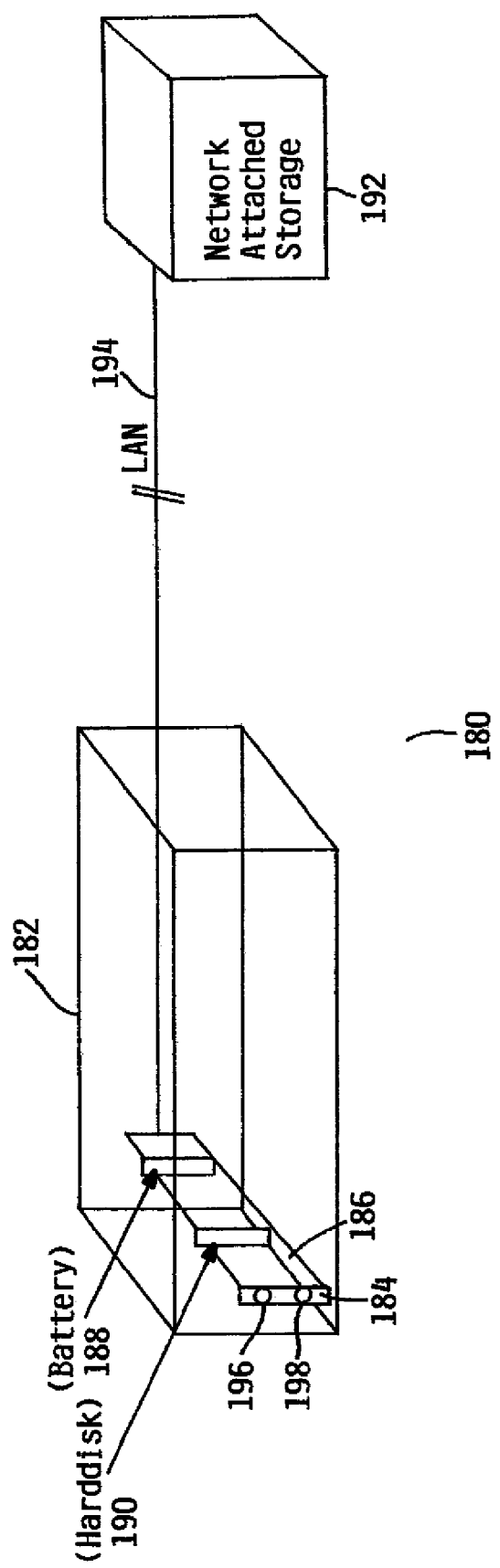
FIG. 5 is a diagram of a multi-component computer system, illustrating an alternative power management tool.

It will be appreciated that, although specific embodiments of the invention have been described herein for purposes of illustration, various modifications may be made without departing from the spirit and scope of the invention. In particular, each compute component of the system may include a manual switch in conjunction with or independent of a software management system. FIG. 5 is an illustration of a multi-component computer system (180). In this illustration, a single component (184) is shown placed in a chassis (182). The component (184) has a printed circuit board (186) which includes a local battery (188) and a hard disk (190). The component (184) has a communication port (not shown) to enable the component to be in communication with a network attached storage (192) through a local area network (194). The component (184) has a pair of buttons (196) and (198) on the front of the component. A first button (196) is used to place the component into Hibernate, and a second button (198) is used to placed the component in Suspend. When the component is operating at full power, each of the buttons (196) and (198) will illuminate in a first color to indicate full power indicating the state of operation. At such time as one of the buttons (196), (198) is activated by an operator or an external pressure source, the button (196), (198) will illuminate under a second color to indicate the component is in the process of changing it's state of operation. Once the component has completed transformation to the desired state of operation, the button (196), (198) will illuminate in a third color. Although the buttons have been shown with colors to indicate a state of operation, the buttons may also use indicia associated therewith to indicate a state of operation. Similarly, in place of buttons mounted to the component (184), a communication tool, such as a keyboard, may be used to initiate a change of the state of operations of a component. Accordingly, the scope of protection of this invention is limited only by the following claims and their equivalents.

I claim:

1. A method for managing power within a compute component of a multiprocessor system comprising:

individually analyzing utilization of at least two compute components within a networked computing environment;

determining if a continued operating state is required for each of said compute components based upon said analysis;

individually modifying a state of operation of at least one of said compute components in response to said determination of said required operating state, wherein one available state supports communication of an operating system image of said at least one of said compute components to storage media in communication with network attached storage before turning off power supply of said computer component, and booting said operating system image at a later time on a separate computer component; and re-partitioning said system, including switching operating system images by having said components reload their image from at least one of a group of separate hibernated images.

2. The method of claim 1, further comprising controlling granular management of a power consuming accessory within said compute component.

3. The method of claim 1, wherein modifying a state of operation of said compute component includes a software management system to control said state of operation of said compute component.

4. The method of claim 1, wherein said state of operation of said compute component is selected from the group consisting of: maximum power, selective reduction of a hardware accessory, suspend, hibernate, resume, restore, off, and combinations thereof.

5. The method of claim 1, further comprising accessing an alternative image when said compute component is returning from a low power state of operation.

6. The method of claim 5, further comprising hot-swapping said compute component when said component has been modified to operate in said low power state.

7. The method of claim 6, wherein said low power state is selected from the group consisting of: suspend and hibernate.

8. A multiprocessor computing system, comprising:
at least two compute components in a networked computing environment;
a manager adapted to analyze operation of said components within said networked computing environment, wherein said operation includes component utilization;
said manager to individually modify of a state of operation of at least one of said components in response to said analysis, wherein one available state supports communication of an operating system image of said at least one of said compute components to storage media in communication with network attached storage;
storage of an operating system image of at least one of said computer components in said network attached storage prior to removing power supply of said compute component, and a boot of said operating system image at a later time on a separate component; and
a re-partition of said system, including a switch of said operating system images by having said components reload their image from at least one or a group of separate hibernated images.

9. The system of claim 8, wherein said modification of a state of operation includes granular management of a power consuming accessory of said component.

10. The system of claim 9, wherein said accessory is selected from the group consisting of: a microprocessor, a disk drive, an I/O port, a chip, and combinations thereof.

11. The system of claim 8, wherein said component operates in a state selected from the group consisting of: maximum power, selective reduction of power, suspend, hibernate, resume, restore, off, and combinations thereof.

12. The system of claim 8, wherein said component is adapted to accommodate a hot-swap procedure when said component has been modified to operate in a low power state.

13. The system of claim 12, wherein said low power state is selected from the group consisting of: suspend and hibernate.

14. An article comprising:
a computer-readable carrier including computer program instructions configured to manage power of a compute component, comprising:
instructions to individually analyze operation of at least two compute components within a networked computer environment;
instructions to determine if a continued operating state is required for each of said compute components based upon said analysis; and
instructions to modify a state of operation of at least one of said components in response to said determination of said required operating state, wherein one available state supports communication of an operating system image of said at least one of said compute components to storage media in communication with network attached storage before turning off power supply of said computer component, the instructions including booting said operating system image at a later time on a separate computer component, and re-partitioning said system, including switching operating system images by having said components reload their image from at least one of a group of separate hibernated images.

15. The article of claim 14, wherein said state of operation of said compute component is selected from the group consisting of: maximum power, selective reduction of a hardware accessory, suspend, hibernate, resume, restore, off, and combinations thereof.

16. The article of claim 14, further comprising instructions to control granular management of a power consuming accessory within said compute component.

17. The article of claim 14, wherein said instructions to modify a state of operation of said components includes instructions to accommodate a hot-swap of said compute component when said component has been modified to operate in said low power state.

18. The article of claim 14, further comprising instructions to access an alternative operating system image when said component returns from a low power state of operation.

* * * * *